United States Patent

Rawle

Patent Number: 4,672,868
Date of Patent: Jun. 16, 1987

[54] CROSS-FEED FACING HEAD

[75] Inventor: Ralph H. Rawle, Windsor, Canada

[73] Assignee: J. P. Tool Limited, Windsor, Canada

[21] Appl. No.: 847,226

[22] Filed: Apr. 2, 1986

[51] Int. Cl.[4] .............................................. B23B 3/26
[52] U.S. Cl. ....................................... 82/2 E; 82/1.2
[58] Field of Search .................. 82/1.2, 2 E; 408/157, 408/158

[56] References Cited

U.S. PATENT DOCUMENTS

| | | | |
|---|---|---|---|
| 2,404,433 | 7/1946 | Christman | 82/2 E |
| 3,113,475 | 12/1963 | Lombardo | 82/2 E |
| 3,311,003 | 3/1967 | Daugherty | 82/1.2 |
| 3,443,458 | 5/1969 | Ohrnberger et al. | 82/1.2 |
| 4,004,332 | 1/1977 | Wawrzyniak | 29/27 C |
| 4,033,207 | 7/1977 | Peuterbaugh | 82/2 E |
| 4,040,315 | 8/1977 | Bellingham | 82/2 E |
| 4,067,251 | 1/1978 | Eckle | 82/1.2 |
| 4,184,391 | 1/1980 | Eckle | 82/2 E |
| 4,387,612 | 6/1983 | Eckle et al. | 82/2 E |
| 4,411,177 | 10/1983 | Batistoni | 82/2 E |
| 4,476,613 | 10/1984 | Wawrzyniak | 29/27 C |
| 4,577,535 | 3/1986 | Klabunde et al. | 82/2 E |

*Primary Examiner*—Nicholas P. Godici
*Assistant Examiner*—Jerry Kearns

[57] ABSTRACT

A cross-feed facing head is described which includes a housing adapted to be mounted on a spindle for rotation therewith. Slides are mounted in transverse slideways on an end face of the housing, the slides including means for mounting cutting tools and being adapted for movement transversely to the axis of the rotation of the housing. An actuating member is axially, slideably mounted within the housing and has external helical teeth thereon. An annular gear member is mounted within the housing for rotation about the axis thereof and this annular gear member has gear teeth on the outer cylindrical edge thereof and further gear teeth on the inner cylindrical edge thereof, these inner teeth being preferably in the form of a series of spaced and adjustable racks mounted in pockets in the inner cylindrical edge with the teeth thereof mating with the external helical teeth of the actuating member. Rotatable pinion shafts are mounted in the housing for rotation about axes parallel to the axis of rotation of the housing and each pinion shaft has at one end thereof pinion teeth mating with the outer gear teeth of the annular gear member and has at the other end thereof a spur gear which mates with a rack on one side of each slide. The gear train is indexable to allow fresh gear teeth to be moved into the work areas.

14 Claims, 16 Drawing Figures

CROSS-FEED FACING HEAD

BACKGROUND OF THE INVENTION

This invention relates to a cross-feed facing head structure and, more specifically, to a cross-feed facing head in which a slide is moved transversely of a rotating housing by means of an axially movable drawbar.

Cross-feed facing heads or generating heads have been known in the past in which a slide is caused to move transversely of a housing with respect to the axis of rotation by means of a drawbar and examples of such systems can be found in U.S. Pat. Nos. 4,033,207 and 4,040,315. Usually, four different basic actuating mechanisms are used for translating the axial movement of the drawbar into the transverse movement of the slide and these include (a) a rack and pinion mechanism, (b) a bell crank mechanism, (c) an inclined cam mechanism and (d) a helical spline mechanism. None of these is an ideal system, but the helical spline mechanism has some special advantages in terms of smoothness of operation. However, even with the helical spline it is difficult to form female gear teeth to mate smoothly with the helical spline for translating axial movement of the drawbar into rotary motion, and it also requires tremendous force to convert the rotary motion into a motion for transversely moving slides, due to the large mass of the slides.

It is the object of the present invention to provide an improved helical spline system for actuating a crossfeed facing head requiring minimum actuating forces.

SUMMARY OF THE INVENTION

The present invention in its broadest aspect relates to a cross-feed facing head which includes a housing adapted to be mounted on a spindle for rotation therewith. At least one slide is mounted in at least one transverse slideway on an end face of the housing, this slide including means for mounting a cutting tool and being adapted for movement transversely to the axis of the rotation of the housing. An actuating member is axially, slideably mounted within the housing and has external helical teeth thereon. An annular gear member is mounted within the housing for rotation about the axis thereof and this annular gear member has gear teeth on the outer cylindrical edge thereof and further gear teeth on the inner cylindrical edge thereof, these inner teeth mating with the external helical teeth of the actuating member. At least one rotatable pinion shaft is mounted in the housing for rotation about an axis parallel to the axis of rotation of the housing and this pinion shaft has at one end thereof pinion teeth mating with the outer gear teeth of the annular gear member and has at the other end thereof a spur gear which mates with a rack on one side of the slide.

The above gearing arrangement provides a very smooth and positive transfer of motion from axial movement of the actuating member to transverse movement of the slide. It is preferable to use a pair of parallel slides on opposite sides of the rotational center of the housing together with a pair of pinion shafts to actuate the pair of slides. It may also be possible to use as many as six parallel slides on a housing.

According to a particularly preferred embodiment of the invention, the inner teeth on the annular gear member are in the form of a series of small spaced racks mounted in pockets in the inner cylindrical edge of the annular gear member. These racks have the advantage over teeth formed directly in the inner cylindrical edge of being much easier and less expensive to manufacture and being adjustable so that the mesh between the helical teeth on the actuating member and the internal gear teeth of the annular gear member can be adjusted to eliminate backlash.

It is also preferable to provide helical teeth on the outer cylindrical edge of the annular gear member which mate with helical teeth on the pinion shaft, these helical teeth providing exceptionally smooth operation. The outer teeth on the annular gear member are also indexable with respect to the teeth of the pinion shaft, such that several groups of fresh gear teeth may be moved into the work area before the gears need to be changed.

The slides are preferably of minimum mass for ease of movement against centrifugal force. Accordingly, they are preferably of small cross section and are provided with a hollow core. It is preferable to feed the slides from the center to the outside of the head as this reduces the load required to actuate the head. It is also preferable that the slides be positioned such that the center of gravity of each slide never crosses the centerline of the head.

Figure 1:
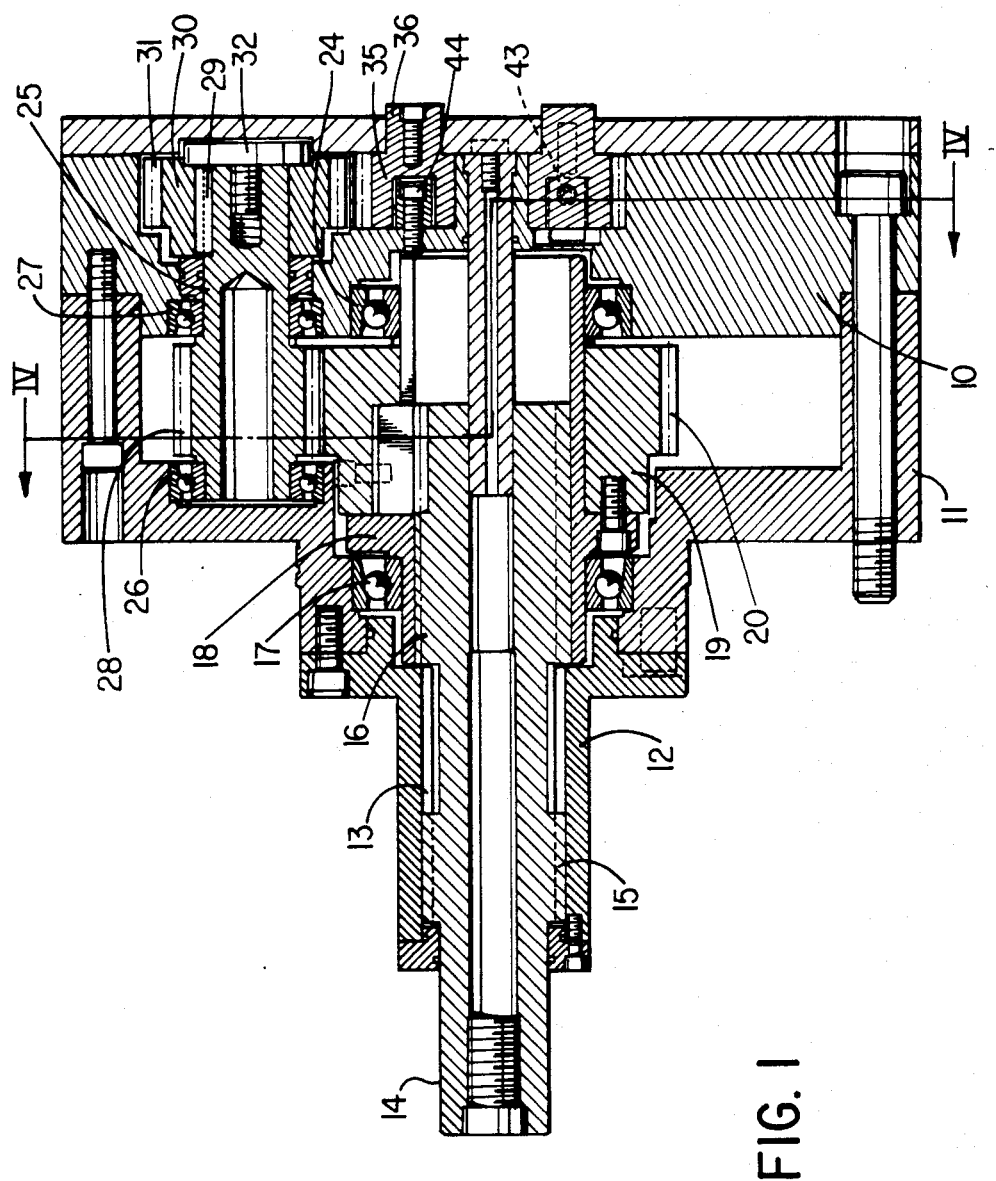
FIG. 1 is a sectional view of a fully assemblied cross-feed facing head.

As will be seen from FIG. 1, the assembly includes a front annular housing member 10 joined to a rear annular housing member 11. Connected to the rear end of housing 11 is a rear guide bushing 12 through which moves an actuating member 14 in the form of a drawbar. This actuating member 14 has splines 15 which slide within grooves 13 of bushing 12, thereby preventing any rotational movement of actuating member 14.

Figure 6:
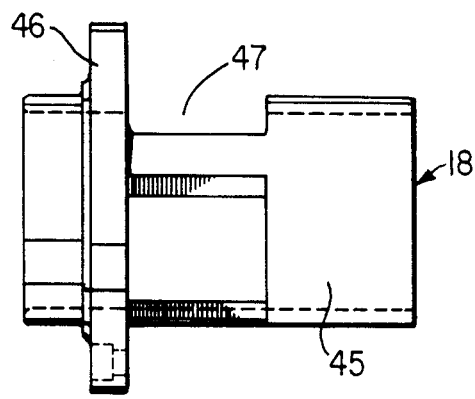
FIG. 6 is a side elevation of a guide bushing.
Figure 7:
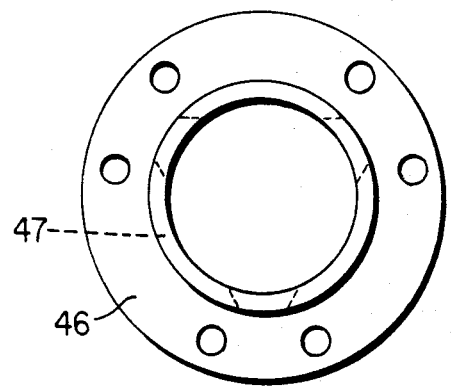
FIG. 7 is an end elevation of the guide bushing of FIG. 6.

A portion of actuating member 14 within the housing includes helical teeth 16. Surrounding these helical teeth is mounted an annular gear member 19 to which is connected a support bushing 18. This support bushing 18 can best be seen in FIGS. 6 and 7 and includes a hollow cylindrical skirt 45 connected to a flange 46. The skirt 45 fits within annular gear member 19.

Figure 4:
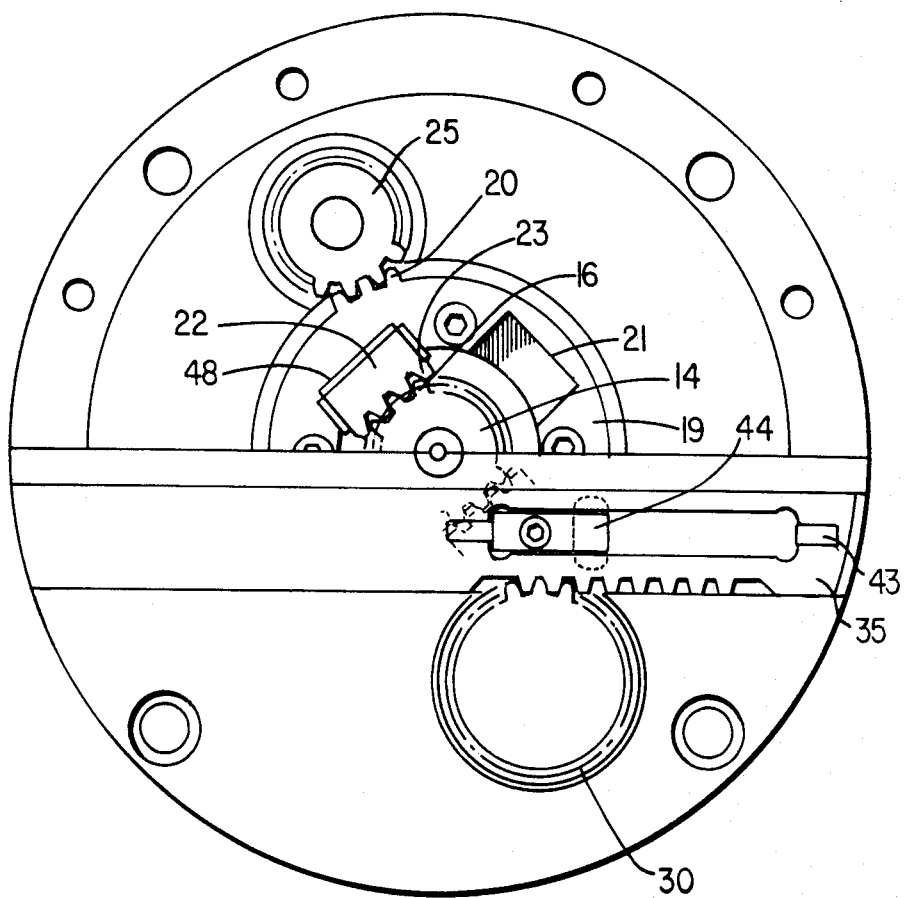
FIG. 4 is an end view taken along line IV-IV of FIG. 1.
Figure 5:
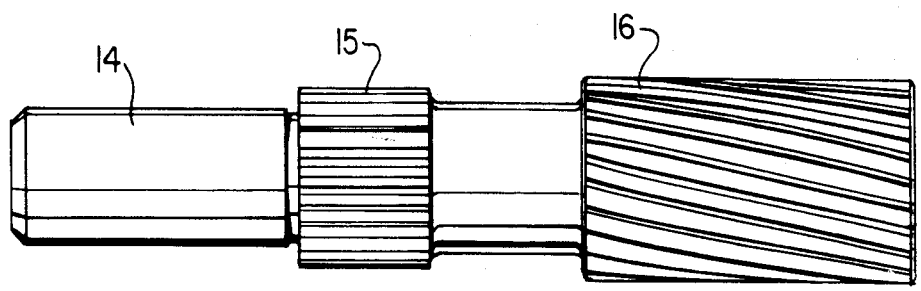
FIG. 5 is a side elevation of a drawbar.
Figure 8:
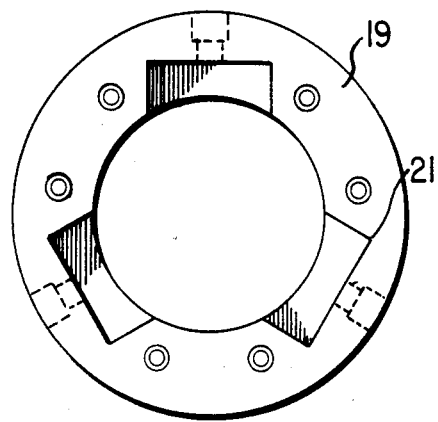
FIG. 8 is an end view of an annular gear member.
Figure 9:
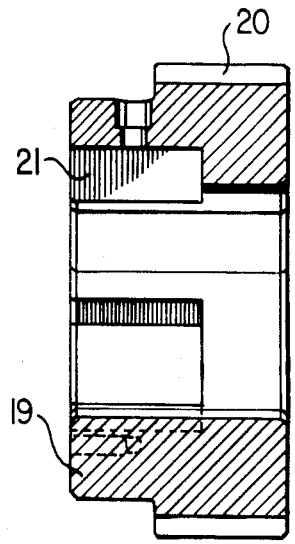
FIG. 9 is a sectional view of the gear member of FIG. 8.
Figure 10:
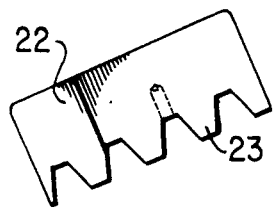
FIG. 10 is a side elevation of a rack.
Figure 11:
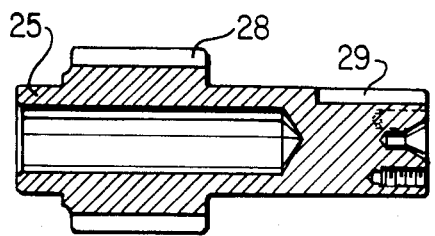
FIG. 11 is a sectional view of a pinion shaft.
Figure 12:
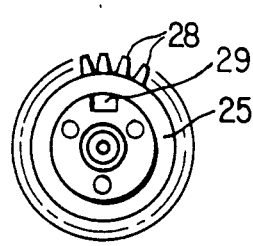
FIG. 12 is an end elevation of the shaft of FIG. 11.
Figure 13:
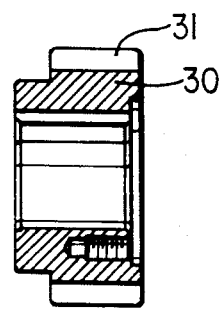
FIG. 13 is a cross section of a spur gear.

This assembly is held in position by bearings 17 and 24. The annular gear member 19 has external teeth 20 on the outer cylindrical edge thereof and, as can better be seen from FIGS. 4, 8 and 9 includes pockets 21 in the inner cylindrical edge thereof which hold racks 22 having teeth 23 which mate with the helical teeth 16 of actuating member 14. These racks 22 extend through openings 47 in guide bushing 18 and the racks can be adjusted within the pockets 21 by spacers 48 so as to provide an exact fit with the helical teeth 16 of actuating member 14. This actuating member is indexable whereby fresh helical teeth 16 engage the racks 22.

Offset from the center line of the housing are a pair of pinion shafts 25 each having external teeth 28 which mate with the external teeth 20 of annular gear 19. Each pinion shaft 25 is held for easy motion by means of bearings 26 and 27.

The outer end of shaft 25 has a groove 29 for receiving a spline to hold thereon a spur gear 30 having external teeth 31. This spur gear 30 is held in position on the pinion shaft 25 by means of a cap member 32. The teeth 31 of spur gear 32 mate with teeth on the side of the slides 35.

The gear member 19 can be indexed to bring unused teeth into the work area. This can be achieved by providing a plurality of equally spaced splines 15 on the actuating member 14 and corresponding grooves 13 in the bushing 12. When the bushing 12 is removed, the actuating member 14 can be rotated to a new radial position thereby also rotating gear member 19 and bring fresh gear teeth into the work area. The bushing 12 is then fixed in position again to retain the actuating member 14 and gear member 19 in the new radial position. With this arrangement, it may for instance be possible to index the gear member 19 three times to utilize fresh gear teeth before it is necessary to replace the gear.

Figure 14:
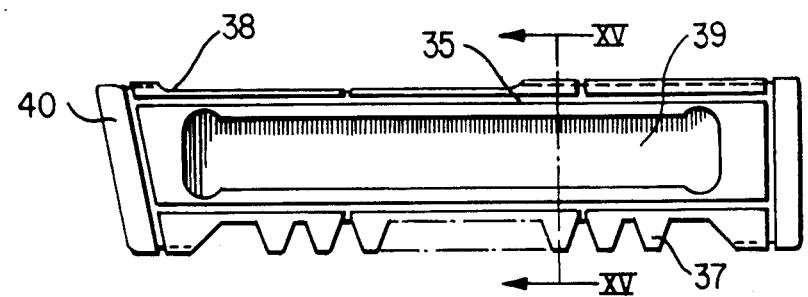
FIG. 14 is a plan view of the inner face of a slide.
Figure 15:
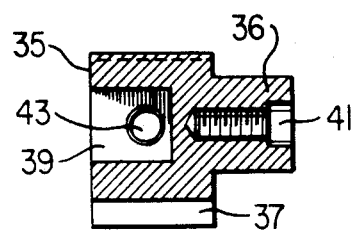
FIG. 15 is a cross section of the slide.
Figure 16:
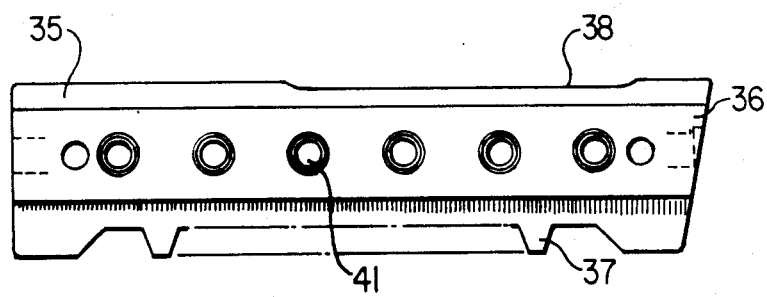
FIG. 16 is an outer plan view of the slide.

The slides are shown in greater detail in FIGS. 14–16 and it will be seen that each slide includes a main body portion 35 and a projecting strip 36. A series of teeth 37 are provided along the main body portion and these teeth mate with the teeth 31 of spur gear 30. Each slide 35 is mounted within a slideway and held in place by means of end keeper plates 33 and 34.

The main body portion of the slide includes an elongated slot 39 recessed into the top face thereof and extending a substantial proportion of the length of the slide. This slot serves both to decrease the weight of the slide and to provide a simple means for limiting the movement of the slide transversely. Thus, a block 44 is mounted in the housing within the recess 39 and this serves to limit the transverse movement of the slide. These limits can be adjusted by means of adjustable set screws 43 mounted at each end of the slide and extending into the slot.

The outer face of each slide includes a series of holes 41 for mounting a tool holding block.

Figure 2:
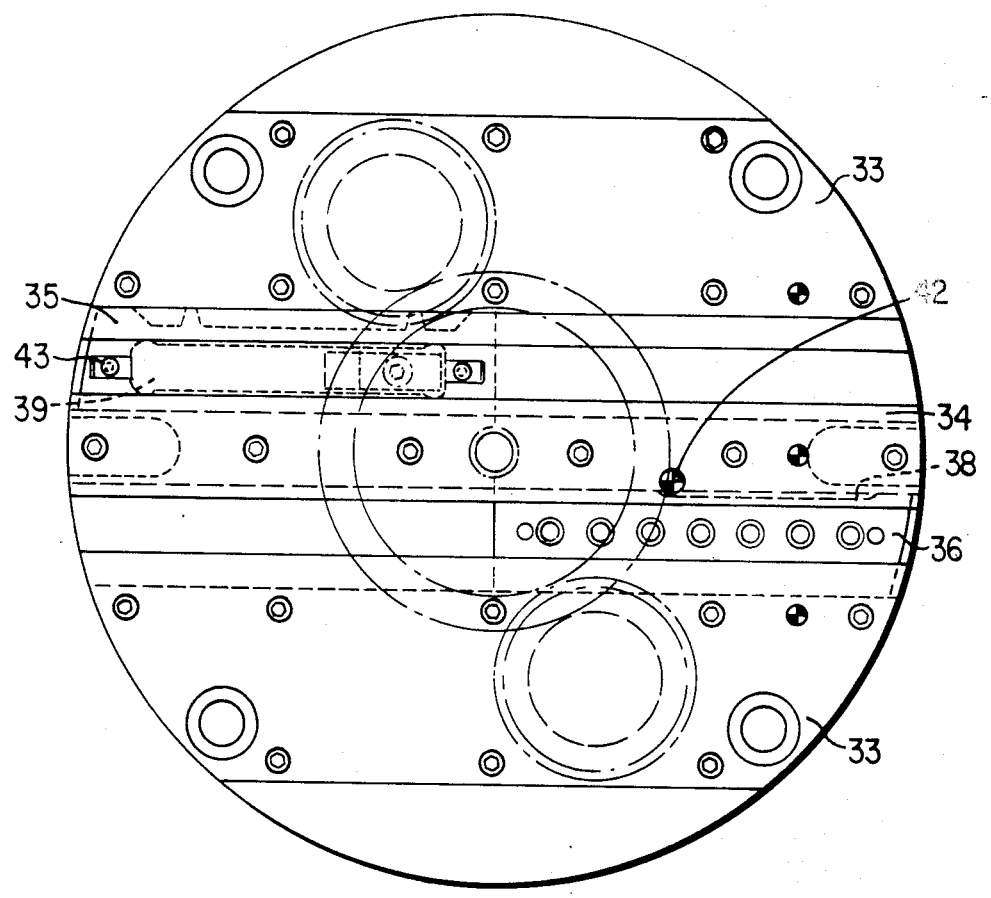
FIG. 2 is a front end elevation.
Figure 3:
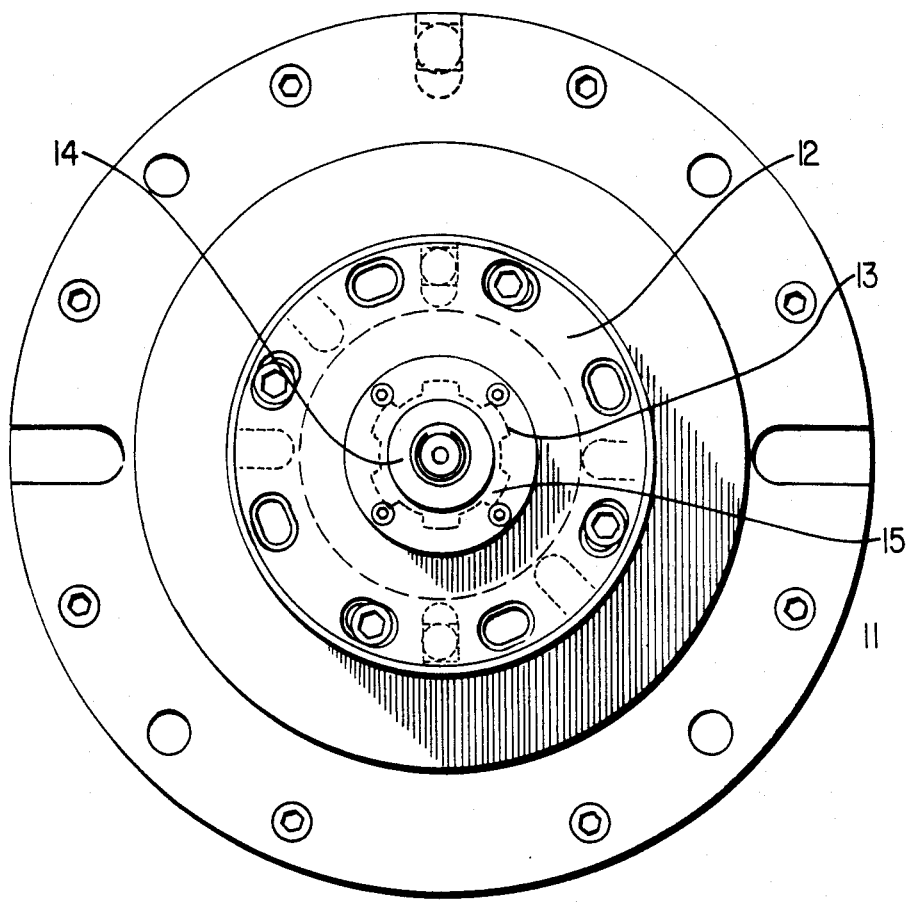
FIG. 3 is a rear end elevation.

As an additional safety feature, a recess 38 may be provided along one edge face of the slide and, as will be seen from FIG. 2, this recess mates with a pin 42 so that if some form of failure occurs, the slide cannot fly out of the machine and is wedged in place by means of pin 42.

While the above specific description shows two slides in parallel, it is possible within the scope of this invention to use a single slide with one pinion gear and a counterbalance for the slide, or to use more than two slides in parallel.

I claim:

1. A cross-feed facing head comprising:
    a housing adapted to be mounted on a spindle for rotation therewith,
    at least one slide mounted in at least one transverse slideway in an end face of the housing, said slide including means for mounting a cutting tool and being adapted for movement transversely to the axis of rotation of the housing,
    an actuating member axially, slideably mounted within the housing and having external helical teeth thereon,
    an annular gear member mounted within the housing for rotation about the axis thereof, said annular gear member having gear teeth on the outer cylindrical edge thereof and teeth on the inner cylindrical edge thereof for engagement with said helical teeth of the actuating member,
    at least one rotatable pinion shaft mounted in said housing for rotation about an axis parallel to the axis of rotation of the housing, said pinion shaft having at one end thereof pinion teeth mating with the outer gear teeth of said annular gear member and having at the other end thereof a spur gear mating with a rack on one side of said at least one slide.

2. A facing head according to claim 1 having a pair of parallel slideways and slides on opposite sides of the rotational center of the housing and a pair of said pinion shafts to actuate said slides.

3. A facing head according to claim 1 having from two to six parallel slideways and slides, with corresponding pinion shafts to actuate said slides.

4. A facing head according to claim 1 wherein the teeth on the inner cylindrical edge of the annular gear member comprise toothed racks mounted in pockets in said inner cylindrical edge.

5. A cross-feed facing head comprising:
    a housing adapted to be mounted on a spindle for rotation therewith,
    slides mounted in a pair of parallel, transverse slideway in an end face of the housing, each slide including means for mounting a cutting tool and being adapted for movement transversely to the axis of rotation of the housing,
    an actuating member axially, slideably mounted within the housing and having external helical teeth thereon,
    an annular gear member mounted within the housing for rotation about the axis thereof, said annular gear member having gear teeth on the outer cylindrical edge thereof and toothed racks mounted in pockets in the inner cylindrical edge thereof for engagement with said helical teeth of the actuating member,
    rotatable pinion shafts mounted in said housing for rotation about axes parallel to the axis of rotation of the housing, each pinion shaft having at one end thereof pinion teeth mating with the outer gear teeth of said annular gear member and having at the other end thereof a spur gear mating with a rack on one side of each said slide.

6. A facing head according to claim 5 wherein said actuating member is an axially slidable, non-rotatable drawbar.

7. A facing head according to claim 6 wherein the gear teeth on the outer cylindrical edge of the annular gear member and on each pinion shaft are mating helical gear teeth.

8. A facing head according to claim 6 wherein the racks mounted in the inner edge of the annular gear member are adjustable within the pocket to permit accurate mating with the helical teeth of the actuating member.

9. A facing head according to claim 6 wherein each slide has a longitudinal slot recessed into the top face thereof and extending longitudinally a substantial proportion of the total length of the slide.

10. A facing head according to claim 9 wherein a block is fixed to the housing within said slot to limit the distance of movement of the slide in each transverse direction.

11. A facing head according to claim 10 wherein set screws extend through the ends of each slide and into the slot, said set screws serving as adjustable stops for the slide.

12. A facing head according to claim 11 wherein the adjustable stops are positioned such that the center of gravity of each slide cannot pass the center of the end face.

13. A facing head according to claim 6 wherein the drawbar is mounted in a removable bushing, with mating slots and splines in the drawbar and bushing providing axially slidable, non-rotatable movement between the drawbar and bushing.

14. A facing head according to claim 13 wherein there are a plurality of equally spaced slots and splines, permitting radial adjustments of the drawbar relative to the bushing and thereby indexing the gears to present unused teeth in the work areas.

* * * * *